J. C. PACKARD.
STABILIZER FOR AIRSHIPS.
APPLICATION FILED MAY 31, 1918.
1,370,041.
Patented Mar. 1, 1921.
2 SHEETS—SHEET 1.
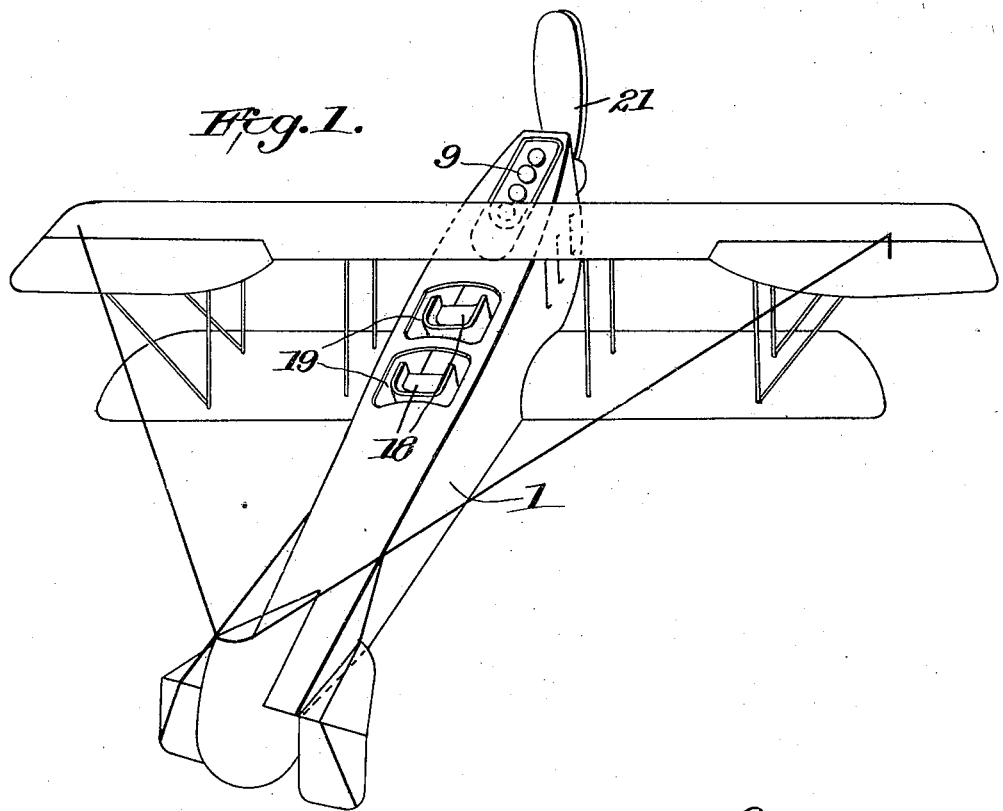
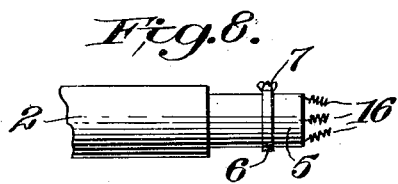
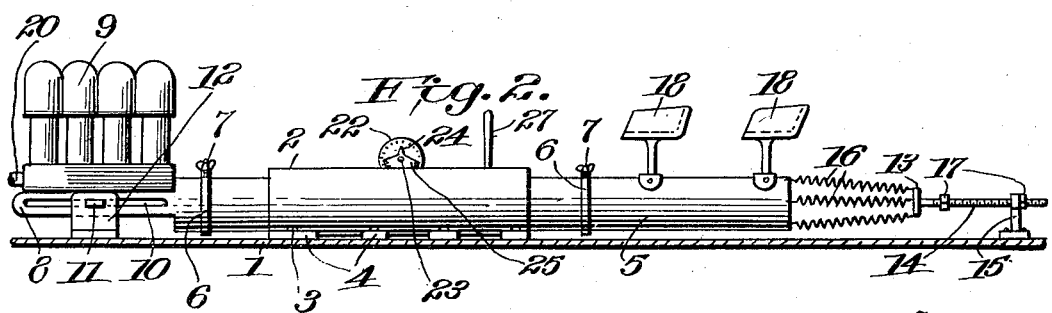
Inventor,
J. C. Packard,
By Frank R. Sheery
Attorney.

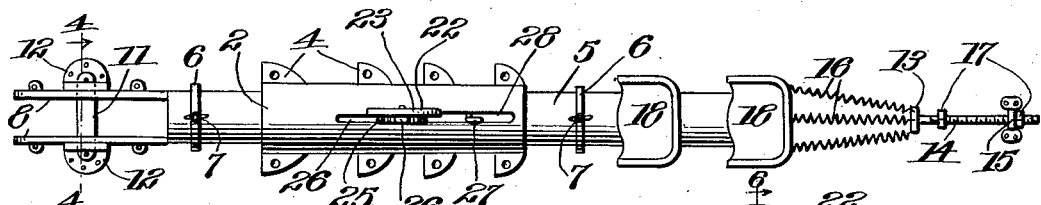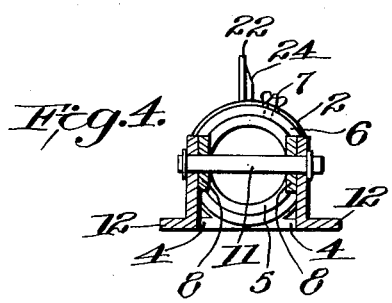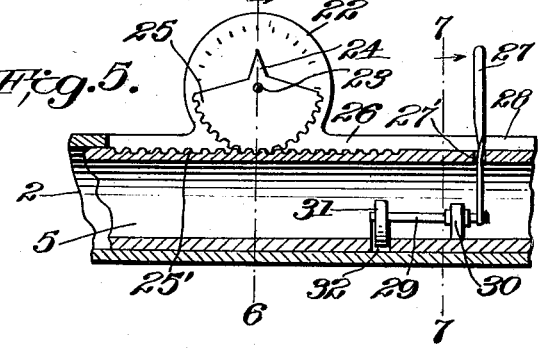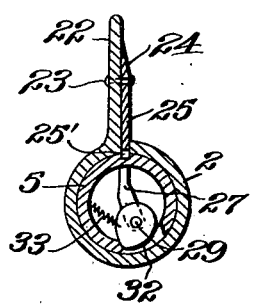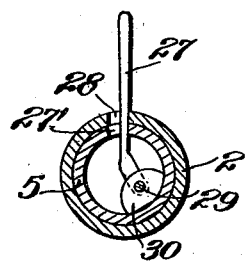

UNITED STATES PATENT OFFICE.

JOHN C. PACKARD, OF DENVER, COLORADO.

STABILIZER FOR AIRSHIPS.

1,370,041.                    Specification of Letters Patent.        Patented Mar. 1, 1921.

Application filed May 31, 1918. Serial No. 237,496.

*To all whom it may concern:*

Be it known that I, JOHN C. PACKARD, a citizen of the United States, residing at Denver, in the county of Denver and State of Colorado, have invented certain new and useful Improvements in Stabilizers for Airships, of which the following is a specification.

My invention relates to a load-supporting means for airships capable of shifting automatically according to the angle of flight and relative to the center of gravity to facilitate ease of control and speed during flight.

A particular object is to provide a means to shift the motor in the manner mentioned and the aviator's seat in the same way, either separately or together.

Also I aim to provide in a device of this kind a sliding member to support the load movable against the tension of spring means; having indicating means to indicate the position of the member; having a suitable means to brake its movement, and otherwise possessing the features of construction and accomplishing the advantages hereinafter described with relation to accompanying drawings illustrating one preferred embodiment and wherein—

Figure 1 is a perspective view of an airplane having my improvements embodied therein; Fig. 2 is a side elevational view of the load supporting device and a portion of the body in section; Fig. 3 is a plan view of the load supporting device: Fig. 4 is a cross-sectional view on the line 4—4 of Fig. 3; Fig. 5 is a fragmentary longitudinal sectional view; Fig. 6 is a cross-sectional view on the line 6—6 of Fig. 5; Fig. 7 is a cross-sectional view on the line 7—7 of Fig. 5 and Fig. 8 is a fragmentary side elevation of a modified form.

Referring particularly to the drawings, an air plane has been shown in Fig. 1 in order that the relation of the improvements to an airship may be understood. It is to be borne in mind that this illustration is by way of example only as the improvements may be applied to airships or flying machines generally.

Within the body 1 of this airplane, the improvements are longitudinally disposed for proper operation. A tubular bearing 2 serves as the base and is secured longitudinally within the body by fastening means such as bolts 3 passing through ears 4 on the bearing and through the base or bottom of the body.

Slidable within and longitudinally of the bearing 2, is a carriage or support 5, for convenience being tubular in the present embodiment. Rings or collars 6 surround the carriage 5 and may be clamped thereto at different locations by means of set screws 7 so as to form fixed stops to limit the sliding movement of the carriage in both directions by abutment against the bearing 2.

One end of the carriage 5 may be cut away to provide supporting arms 8 to which the motor of the airplane, as suggested at 9, may be fastened in any suitable manner. As the constructions of the different types of motors differ materially, each type will probably be provided with a different fastening means to secure it to the arms 8. These arms 8 are provided with longitudinally elongated slots 10 through which a bar 11 extends to prevent turning of the carriage. Suitable supports 12 mount the bar 11, as from the base of the body 1.

At the end opposite to the motor, the carriage 5, has spring means connected thereto consisting of any number of springs 16, ranging in most cases from one to ten, which are also connected to a head 13 of a screw threaded rod 14 supported by and slidable through a bearing 15 rising from the base body 1. Suitable nuts 17 may work along the rod 14 for engagement with the bearing 15 for regulation and control of the tension of the springs 16.

While the motor forms a material part of the load and it is the main purpose to have it move according to the change in the center of gravity, yet if desired, the seat or seats of the aviators as at 18, may be mounted from the carriage 5 so as to move therewith and be disposed in the cockpits 19 of the body. When the seats are not carried by the carriage, said carriage is much shorter as indicated in the modified form of Fig. 8.

The shaft 20 of the motor drives the propeller 21.

In order that the aviator may determine the relative position of the carriage 5 at all times, a dial is rigidly mounted on the bearing 2 as at 22. Pivoted to the dial at 23, is an indicator 24, having a segmental gear portion 25 whose teeth mesh with those of the rack 25' provided in the top of the carriage 5. An elongated slot 26 is provided longitudinally of the bearing 2 in which the gear 25 moves and through which a lever 27 extends, and relatively to which lever, a portion of the slot as at 28 is laterally enlarged to permit slight lateral movement of the lever. A laterally elongated slot 27' is provided in the carriage 5 and said lever extends therethrough.

Lever 27 is rigidly fixed on a shaft 29 mounted in a bearing 30 fastened to and within the carriage 5. A head 31 is mounted eccentrically on the shaft 29 so that upon moving the lever 27 laterally, the head 31 will extend through a slot 32 of carriage 5 and frictionally engage the interior of the bearing to thus serve as a brake to arrest the movement of the carriage or hold it in any position desired. A spring 33 connected to the head 31 and to the carriage normally holds the head out of braking engagement with the bearing 2.

When in use the motor is started and if desired the lever 27 may be moved to apply the brake and hold the carriage 5 against movement until the machine leaves the ground. The brake will then be released and the pull of the propeller will draw the motor and carriage forwardly against the tension of the springs 16. For straight flying the lever 27 will be left free and if the nose or forward end of the machine is raised for climbing the pull of the propeller will hold the carriage relatively stationary while the fuselage will move rearwardly of the carriage. If it is desired to have the carriage and motor move forwardly more than ordinarily is desired, the motor will be raced and this will draw the carriage forwardly. The brake will then be applied and the carriage will be held against rearward movement by the springs until the brake is released. If the machine is put into a glide the motor will be slowed down and the springs will draw the carriage and motor rearwardly of the fuselage. It will thus be seen that the center of gravity will be changed when climbing or gliding and further that if it is desired to change the center of gravity when flying level it is simply necessary to increase or decrease the speed of the motor and after applying the brake, return to the normal speed. Therefore if a machine is nose heavy or tail heavy this can be cured while in the air.

Various changes in the details of construction may be resorted to within the spirit and scope of the invention.

I claim:—

1. In a movable body, a load carriage, means to mount the carriage for sliding movement according to changes in and relative to the center of gravity, and resilient yieldable securing means for the carriage.

2. In a movable body, a load carriage, means to mount the carriage for automatic sliding movement according to changes in and relative to the center of gravity, and means operable to brake said movement of the carriage.

3. In a movable body, a load carriage, means to mount the carriage for automatic sliding movement relative to changes in and according to the center of gravity, a lever movable laterally of the carriage, a shaft to which said lever is fixed mounted on the carriage, and a brake member fixed to the shaft for movement against the first mentioned means to brake said movement of the carriage.

4. In a movable body, a load carriage, means to mount the carriage for sliding movement longitudinally of the body, means to prevent turning of the carriage relative to the body, means to limit the sliding movement of the carriage and resilient means to yielding retard longitudinal movement of the carriage.

5. In a movable body, a bearing, a carriage slidable in said bearing, means yieldably holding the carriage against sliding movement, means to limit the movement of the carriage engageable with said bearing, an arm extending from the carriage, and means on said arm engageable with the bearing to prevent turning of the carriage.

6. In a movable body, a bearing, a carriage slidable in said bearing, said bearing being provided with an elongated slot means to permit yielding movement of the carriage, means to limit the movement of the carriage, a dial on the bearing, said carriage having teeth, an indicator pivoted to the dial and having teeth meshing with said teeth, a lever extending through the same slot and movable laterally of the carriage, said slot being enlarged relatively to the lever, the carriage also having a slot through which the lever passes, a brake operable by the lever, and said carriage having a slot through which the brake extends to engage the bearing.

In testimony whereof I have affixed my signature in the presence of two witnesses.

JOHN C. PACKARD.

Witnesses:
I. L. ROSENBAUM,
A. F. FOLEY.